(12) United States Patent
Conard

(10) Patent No.: US 10,971,033 B2
(45) Date of Patent: Apr. 6, 2021

(54) VISION ASSISTIVE DEVICE WITH EXTENDED DEPTH OF FIELD

(71) Applicant: Freedom Scientific, Inc., Clearwater, FL (US)

(72) Inventor: Todd Conard, Ruskin, FL (US)

(73) Assignee: Freedom Scientific, Inc., Clearwater, FL (US)

( * ) Notice: Subject to any disclaimer, the term of this patent is extended or adjusted under 35 U.S.C. 154(b) by 0 days.

(21) Appl. No.: 16/269,741

(22) Filed: Feb. 7, 2019

(65) Prior Publication Data

US 2020/0258421 A1 Aug. 13, 2020

(51) Int. Cl.
*G09B 21/00* (2006.01)
*H04N 5/232* (2006.01)

(52) U.S. Cl.
CPC ..... *G09B 21/001* (2013.01); *H04N 5/232125* (2018.08)

(58) Field of Classification Search
CPC ................. G09B 21/001; H04N 5/232125
See application file for complete search history.

(56) References Cited

U.S. PATENT DOCUMENTS

| D211,414 | S | 6/1968 | Hockenberry |
| D254,868 | S | 4/1980 | Hoadley |
| D270,277 | S | 8/1983 | Studer |
| 4,888,195 | A | 12/1989 | Huhn et al. |
| 4,928,170 | A | 5/1990 | Soloveychik et al. |
| 5,633,674 | A | 5/1997 | Trulaske et al. |

(Continued)

FOREIGN PATENT DOCUMENTS

| EP | 2065871 B1 | 5/2010 |
| JP | 2005318023 A | 11/2005 |
| WO | 2013177380 A1 | 11/2013 |

OTHER PUBLICATIONS

Liang, Jian, Doermann, David, Huiping, Li; "Camera-based analysis of text and documents: a survey"; International Journal of Document Analysis and Recognition (IJDAR), Springer, Berlin, DE, vol. 7, No. 2-3, Jul. 1, 2005 (Jul. 1, 2005), pp. 84-104, XP019352711, ISSN: 1433-2825, DOI: 10.1007/S10032-004-0138-Z.

*Primary Examiner* — Nam D Pham
(74) *Attorney, Agent, or Firm* — GrayRobinson, P.A.; Michael J. Colitz, III

(57) ABSTRACT

The present disclosure relates to a vision assistive device for use by blind or low vision users. The device includes an imaging unit for viewing objects positioned beneath the device. The device further includes a forwardly facing screen for displaying an enlarged view of the imaged object to the user. The imaging unit is configured to take multiple views of the object, each with a different area of focus. This can be accomplished by digitally changing the imaging sensor's area of focus or by pivoting the sensor via a focus motor. In either event, the resulting images are combined into a single, integrated, focused, and composite image. Combining images with differing areas of focus helps eliminate any blurry regions in the composite image. The device further includes a rearwardly positioned fin that facilitates positioning the device in multiple different orientations. In a first orientation, the device is vertically positioned upon a desktop. In a second orientation, the device is reclined and placed in the user's lap with the fin positioned between the user's legs.

6 Claims, 8 Drawing Sheets

(56) References Cited

U.S. PATENT DOCUMENTS

| | | |
|---|---|---|
| D430,588 S | 9/2000 | Goldberg et al. |
| 6,115,482 A | 9/2000 | Sears et al. |
| 6,198,547 B1 | 3/2001 | Matsuda |
| 6,570,583 B1 | 5/2003 | Kung et al. |
| 6,731,326 B1 | 5/2004 | Bettinardi |
| 6,791,600 B1 | 9/2004 | Chan |
| 6,965,862 B2 | 11/2005 | Schuller |
| 7,626,634 B2 | 12/2009 | Ohki et al. |
| D623,214 S | 9/2010 | Onoda |
| 7,805,307 B2 | 9/2010 | Levin et al. |
| 7,899,310 B2 | 3/2011 | Hsieh et al. |
| 8,113,841 B2 | 2/2012 | Rojas et al. |
| 8,194,154 B2 | 6/2012 | Yoon et al. |
| 8,284,999 B2 | 10/2012 | Kurzweil et al. |
| 8,681,268 B2 | 3/2014 | Reznik et al. |
| 9,449,531 B2 | 9/2016 | Reznik et al. |
| 2003/0043114 A1 | 3/2003 | Silfverberg et al. |
| 2004/0100575 A1 | 5/2004 | Malzbender |
| 2004/0165100 A1 | 8/2004 | Motta |
| 2006/0257138 A1 | 11/2006 | Fromm |
| 2007/0188626 A1 | 8/2007 | Squilla et al. |
| 2007/0253703 A1 | 11/2007 | Tsai et al. |
| 2008/0151056 A1 | 6/2008 | Ahamefula |
| 2008/0186287 A1 | 8/2008 | Saila |
| 2008/0260210 A1 | 10/2008 | Kobeli et al. |
| 2009/0225164 A1 | 9/2009 | Renkis |
| 2009/0244301 A1 | 10/2009 | Border et al. |
| 2010/0201801 A1 | 8/2010 | Maruyama et al. |
| 2010/0215354 A1 | 8/2010 | Ohnishi |
| 2011/0128825 A1 | 6/2011 | Tanaka |
| 2011/0194155 A1 | 8/2011 | Kasuga |
| 2012/0001999 A1 | 1/2012 | Schirdewahn et al. |
| 2012/0154543 A1 | 6/2012 | Kasuga |
| 2013/0187774 A1 | 7/2013 | Muecke et al. |
| 2013/0215322 A1 | 8/2013 | Haler |
| 2013/0314593 A1* | 11/2013 | Reznik ............... H04N 1/00562 348/373 |
| 2015/0177382 A1* | 6/2015 | Vogel ..................... G01S 17/08 250/203.2 |
| 2017/0069228 A1 | 3/2017 | Reznik et al. |

* cited by examiner

VISION ASSISTIVE DEVICE WITH EXTENDED DEPTH OF FIELD

BACKGROUND OF THE INVENTION

Field of the Invention

The present disclosure relates to a device for taking an image of an object and displaying the image on an associated screen; more specifically, the disclosure relates to a vision assistive device with an extended depth of field.

Description of the Background Art

As many as 10 million Americans are blind or visually impaired. Over the next 30 years, this number is expected to double. Thus, there is an ever growing need to provide members of the blind/low-vision community with the tools necessary to accomplish daily tasks. These tasks may include reading documents and inspecting or manipulating objects. Although these tasks may be routine for sighted individuals, they present unique difficulties for blind or low vision users.

The background art contains numerous examples of devices for assisting those with visual difficulties. One such example is U.S. Pat. No. 6,198,547 to Matsuda, which discloses an apparatus for reading a document and extracting an image. The apparatus is capable of reproducing the obverse side of a paper such that a copy taken is free of the adverse effect of characters printed on the reverse side of the paper and seen therethrough.

Another example is disclosed by U.S. Pat. No. 6,570,583 to Kung. Kung discloses a handheld device with a display that can zoom in or out according to a signal from a control device. The control device can also be used to make changes to font and icon sizes.

U.S. Pat. No. 7,899,310 to Hsiech is an example of a document snapshot device. The device includes a baseboard, a camera, and a foldable supporting device. The camera is designed to rotate along a plane to assist in taking a snapshot of a document.

One problem with the devices of the background art is that they require complex set up procedures before they can be used. Moreover, operating current vision assistance devices can be problematic for a visually impaired person due to the heavy reliance on digital controls, such as keypads, keyboards, mice, and touch screens. Known devices also suffer from a limited depth of field. As such magnified objects tend to have regions that are blurry or out of focus. There is a further need for vision assistive devices that can be used in multiple configurations. The vision assistive device of the present disclosure is designed to overcome these and other shortcomings of the background art.

SUMMARY OF THE INVENTION

One of the advantages realized by the present device is that it achieves an extended depth of field while using only a single camera.

By providing an extended depth of field the present device helps eliminate peripheral areas that may be out of focus or blurry and does so without the need for multiple image sensors.

A further benefit is realized by allowing the entire surface of an object to be imaged by a single, static image sensor.

Another advantage is attained by permitting a single camera to sequentially change its area of focus and then combine the resulting images to arrive at a single integrated, focused image.

An improvement over known devices is realized by providing a single image sensor that can change its area of focus via digital processing techniques, thereby eliminating the need to pivot or otherwise move the image sensor.

Still yet another advantage is realized by providing a sensor with a focus motor to rotate the sensor and image multiple areas of focus.

Another benefit over known devices is attained by providing a device that can be employed in a standing configuration upon a desktop or a reclined configuration upon a user's lap.

Another advantage is attained by providing a fin-shaped structure upon the rear face of the device, with the fin-shaped device furthering the stability of the device in various orientations.

These and other objects are achieved by providing a vision assistive device for use by blind or low vision users. The device includes an imaging unit that is cantilevered from the main body of the device, and thereby permitting the unit to view objects positioned beneath the device. The device further includes a forwardly facing screen for displaying an enlarged view of the imaged object to the user. The imaging unit can take multiple views of the object, with different areas of focus. The areas of focus can be changed digitally or via the use of a focus motor. These various images can then be combined into a single, focused, composite image. The device disclosure further includes a rearwardly positioned fin that facilitates multiple orientations of the device. In the first orientation, the device is vertically positioned upon a desktop. In the second orientation, the device is reclined and placed in the user's lap with the fin positioned between the user's legs.

The foregoing has outlined rather broadly the more pertinent and important features of the present invention in order that the detailed description of the invention that follows may be better understood so that the present contribution to the art can be more fully appreciated. Additional features of the invention will be described hereinafter which form the subject of the claims of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

The presently disclosed embodiments will be further explained with reference to the attached drawings. The drawings shown are not necessarily to scale, with emphasis instead generally being placed upon illustrating the principles of the presently disclosed embodiments.

Similar reference characters refer to similar parts throughout the several views of the drawings.

DETAILED DESCRIPTION OF THE PREFERRED EMBODIMENT

The present disclosure relates to a vision assistive device for use by blind or low vision users. The device includes an imaging unit for viewing objects positioned beneath the device. The device further includes a forwardly facing screen for displaying an enlarged view of the imaged object to the user. The imaging unit is configured to take multiple views of the object, each with a different area of focus. This can be accomplished by digitally changing the imaging sensor's area of focus or by pivoting the sensor via a focus motor. In either event, a single sensor takes multiple images that are combined into a single, integrated, focused, and composite image. Combining images with differing areas of focus helps eliminate any blurry regions in the composite image. The device further includes a rearwardly positioned fin that facilitates positioning the device in multiple various orientations. In a first orientation, the fin stabilizes the device in a vertically oriented position. In a second orientation, the device is reclined and placed in the user's lap with the fin positioned between the user's legs.

Figure 1:
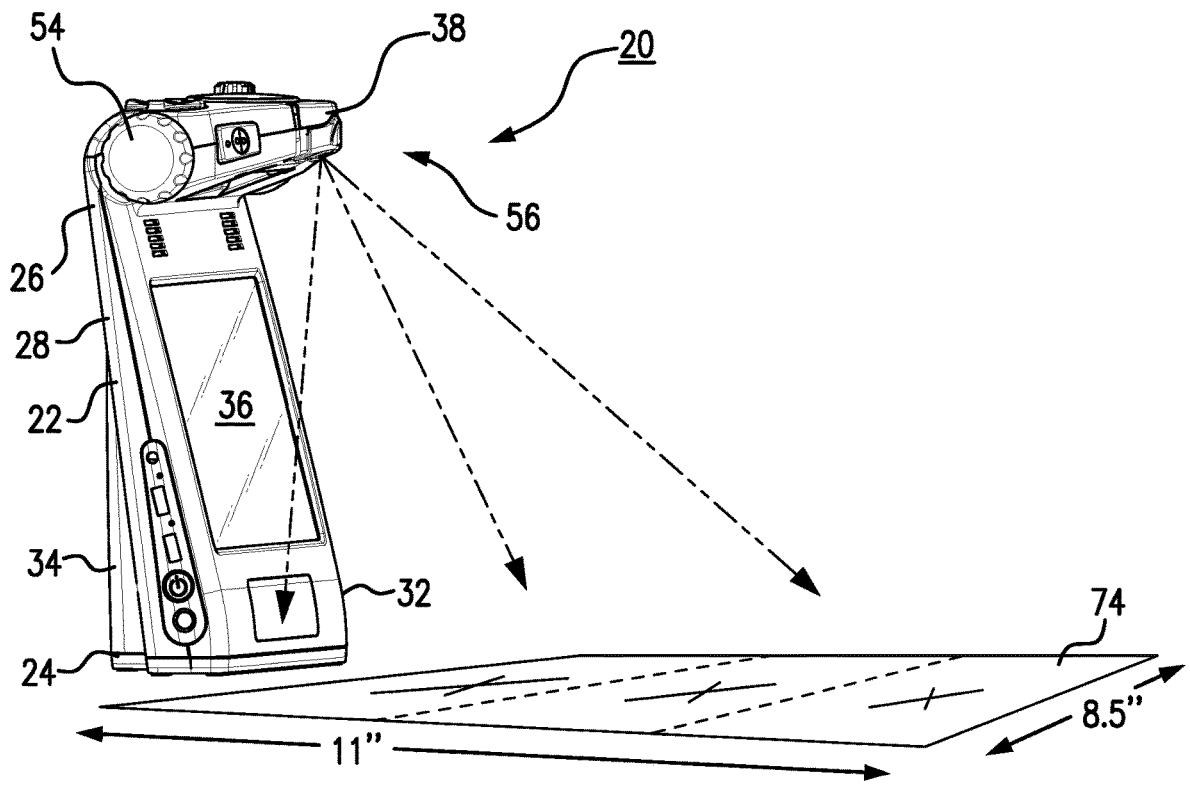
FIG. 1 is a perspective view of the vision assistive device of the present disclosure.

Device 20 includes a main housing 22 with a base region 24, a top region 26, an intermediate region 28, and front and back faces (32 and 34). As noted in FIG. 1, front face 32 includes a display screen 36 that can be, for example, a liquid crystal display. The use of other display types is within the scope of the present disclosure. When resting upon a flat surface, device 20 is angled rearwardly as noted in FIG. 10. The rearward angle of the device facilitates viewing of screen 36 by a user when he/she positioned in front of the device 20. Base region 24 includes a flat lower face that is adapted to rest upon a surface or desktop. In this orientation, a fin 82 helps stabilize the device. As described hereinafter, an inclined orientation is likewise facilitated via the rearwardly located fin 82.

Figure 8:
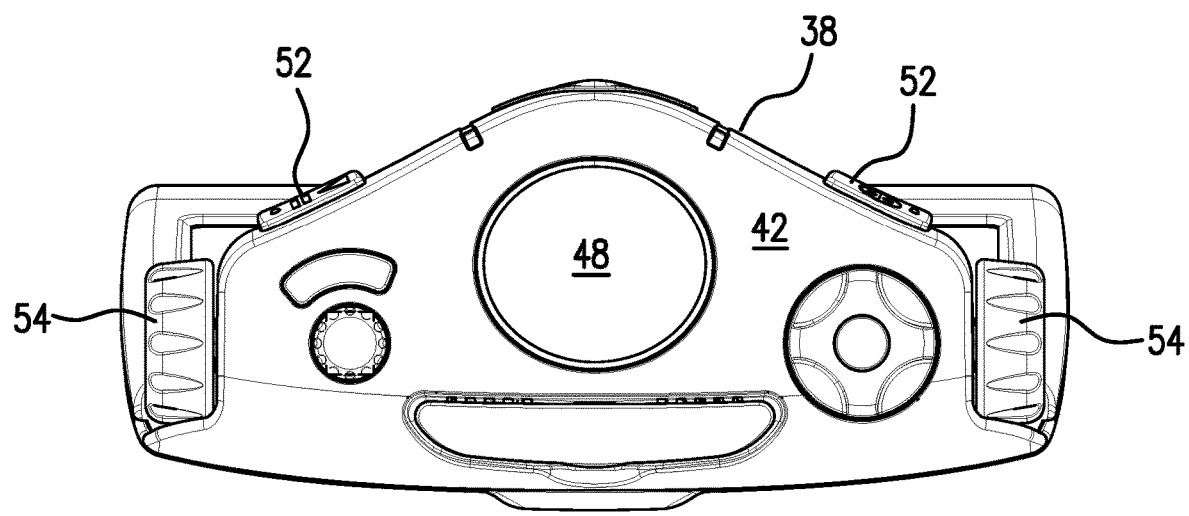
FIG. 8 is a top plan view of the vision assistive device of the present disclosure.
Figures 9, 10:
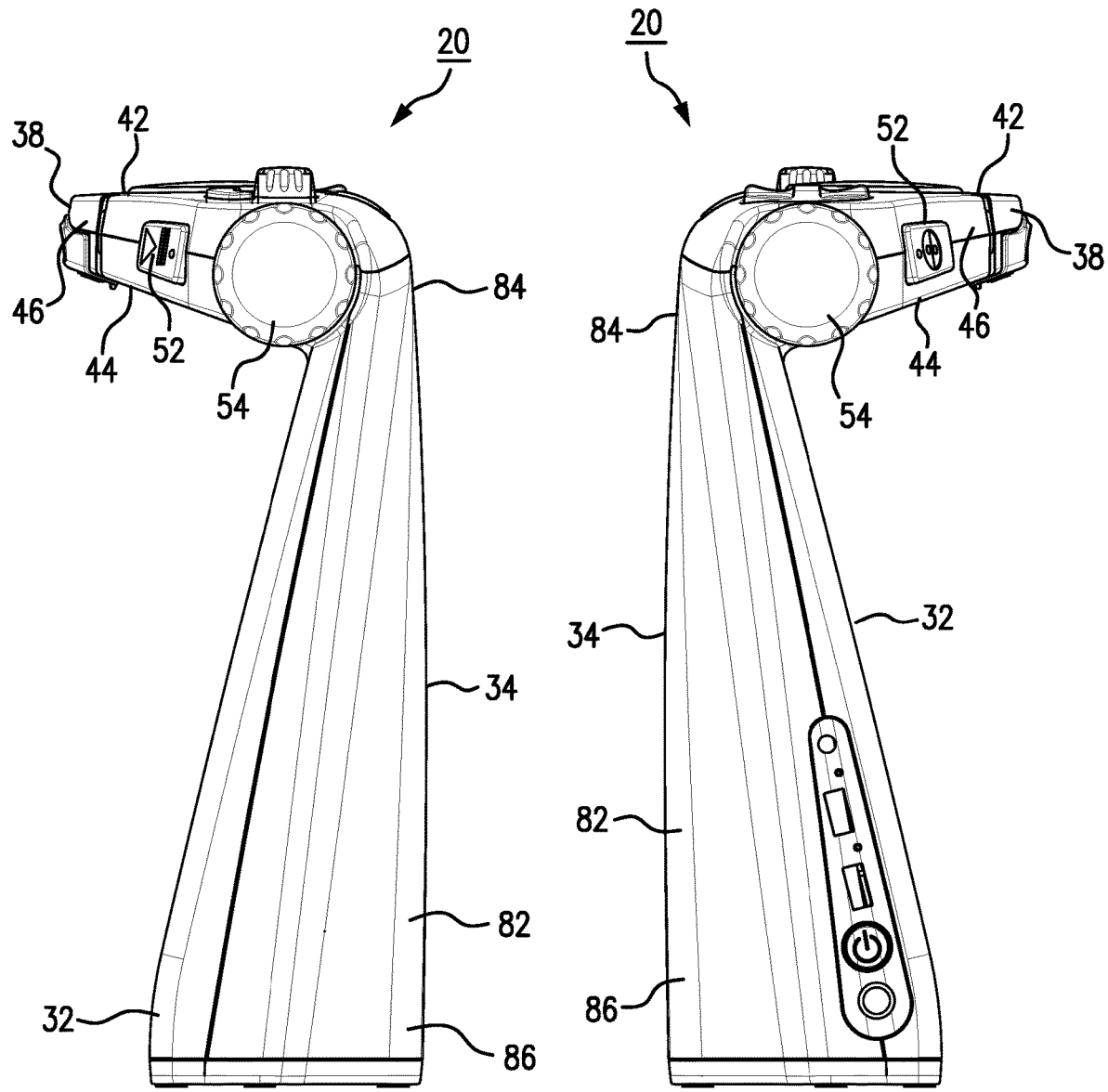
FIG. 9 is a side elevation view of the vision assistive device of the present disclosure.
FIG. 10 is a side elevational view of the vision assistive device of the present disclosure.

With reference to FIGS. 9 and 10 of the disclosure, it will be seen that an overhang 38 is formed at the top region 26 of housing 22. The bottom surface of the overhang 38 is preferably integral with front wall 32. Overhang 38 extends outwardly from device 20 in a cantilevered configuration. Objects 74 to be imaged are preferably positioned below overhang 38. Overhang 38 is defined by upper and bottom surfaces (42 and 44), opposing sides, and a forwardly facing peripheral extent 46. Controls for device 20 may be positioned upon the upper surface 42 of the overhang or along the forwardly facing peripheral extent 46. As also illustrated, further controls are provided on either side of the overhang 38 in the form of roller wheels 54. As best illustrated in FIG. 8, a central circular control 48 is provided that can be used as a scroll wheel. Control 48 allows the user to cycle through various menu options. The circular control 48 may also include LED lighting to illuminate the control depending upon the selected mode. The controls 52 upon the forwardly facing peripheral extent can control, for example, magnification, brightness, or contrast. One of the roller wheels 54 can be used to pan through images on display screen 36, while the other wheel 54 can be used for scrolling.

Figure 11:
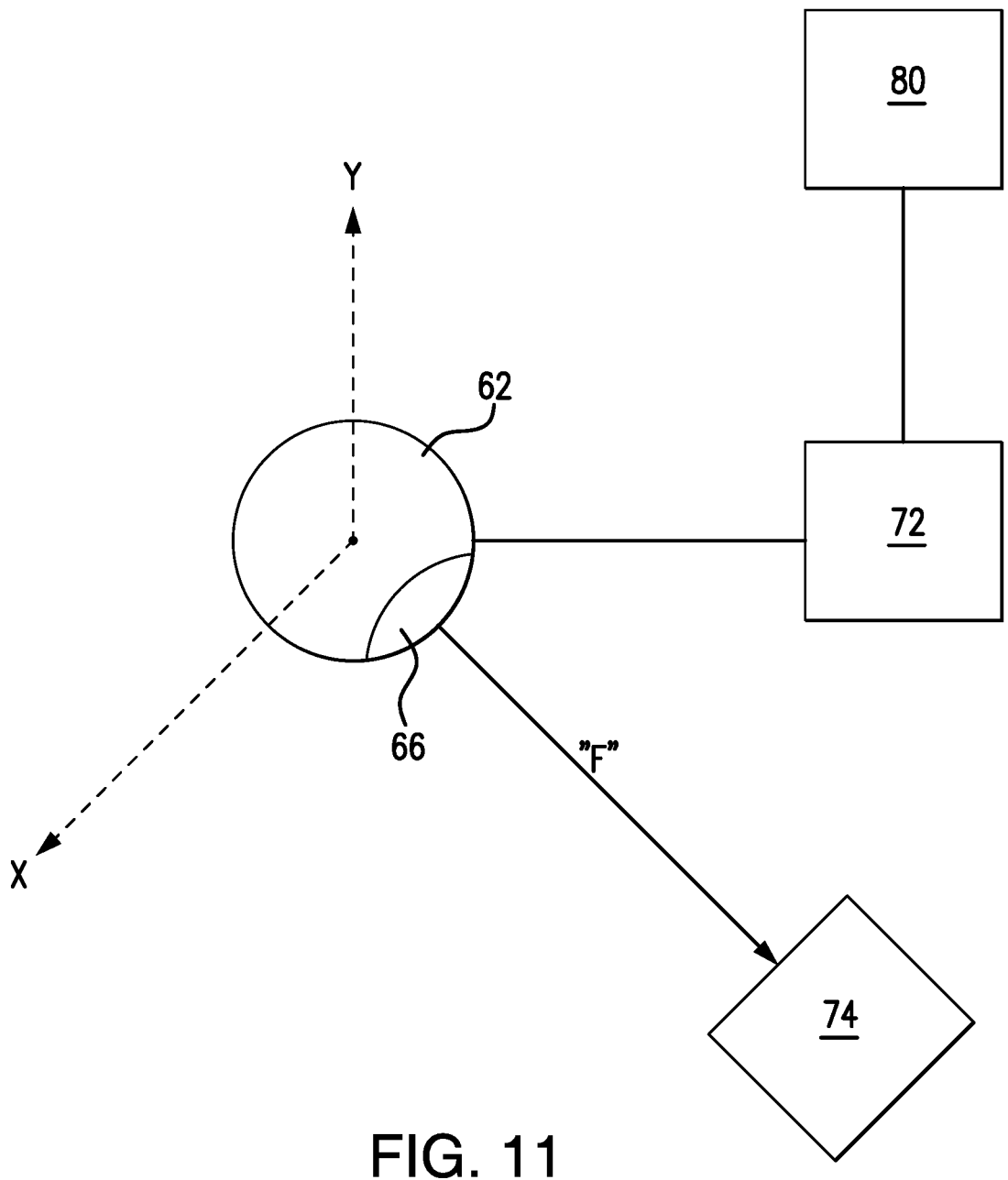
FIG. 11 is a schematic view of the image sensor, focus motor, and memory.

The imaging unit 56 of the device is described next. A single imaging unit 56 is preferably formed within a bottom surface 44 of the overhang so as to point downwardly towards the object 74 to be imaged. Two or more lights 58 such as LEDs may be positioned within an inset and adjacent to the imaging unit 56 to provide proper illumination for the object. As noted in FIG. 11, the imaging unit 56 consists an image sensor 62 and a lens 66. The distance between sensor 62 and lens 66 can be adjusted via any of a variety of known adjustment techniques. A focus motor 72 and a memory store 80 may optionally be included. The focal length "F" is defined by the distance between the image sensor 62 and an area of focus upon object 74.

If only a single area of focus is utilized, the peripheral regions of the resulting image may be blurry or out of focus. In accordance with the invention, the focal length is varied and multiple areas of focus are utilized. This can be accomplished by adjusting the distance between lens 66 and image sensor 62 while at the same time employing digital processing techniques to change the area of focus. Such techniques permit the area of focus to be changed digitally via a singular static image sensor 62. In the preferred embodiment, three different areas of focus are employed as noted by 76(*a*), 76(*b*), and 76(*c*) in FIG. 3. These three separate images span the length of the object being imaged. This object, which may be a piece of paper, preferably is oriented so that its longitudinal axis 77 extends perpendicularly from the base 24 of device 20.

In an alternative embodiment, the focal length can be altered by way of the focus motor 72 associated with the image sensor 62. Specifically, the image sensor 62 can be pivoted about two intersecting and perpendicular X and Y axes via focus motor 72. This allows the image sensor to physically change its area of focus instead of relying upon digital processing techniques. Movement of the image sensor 62 can be controlled manually via the user or automatically on the basis of a pre-established imaging program.

Figure 3:
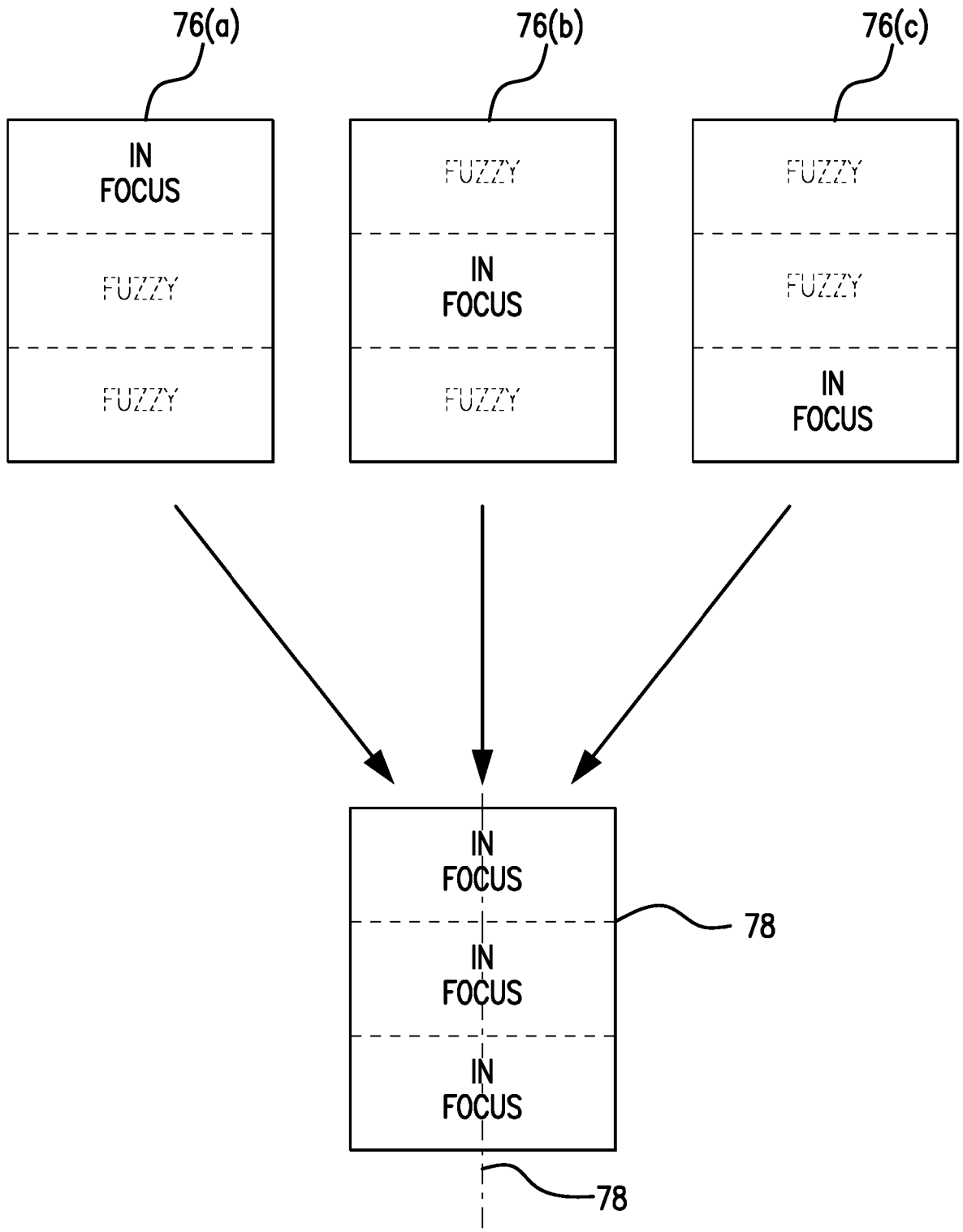
FIG. 3 is a schematic view of the image compilation aspect of the present disclosure whereby several different images are combined into a single composite and focused image.
Figure 4:
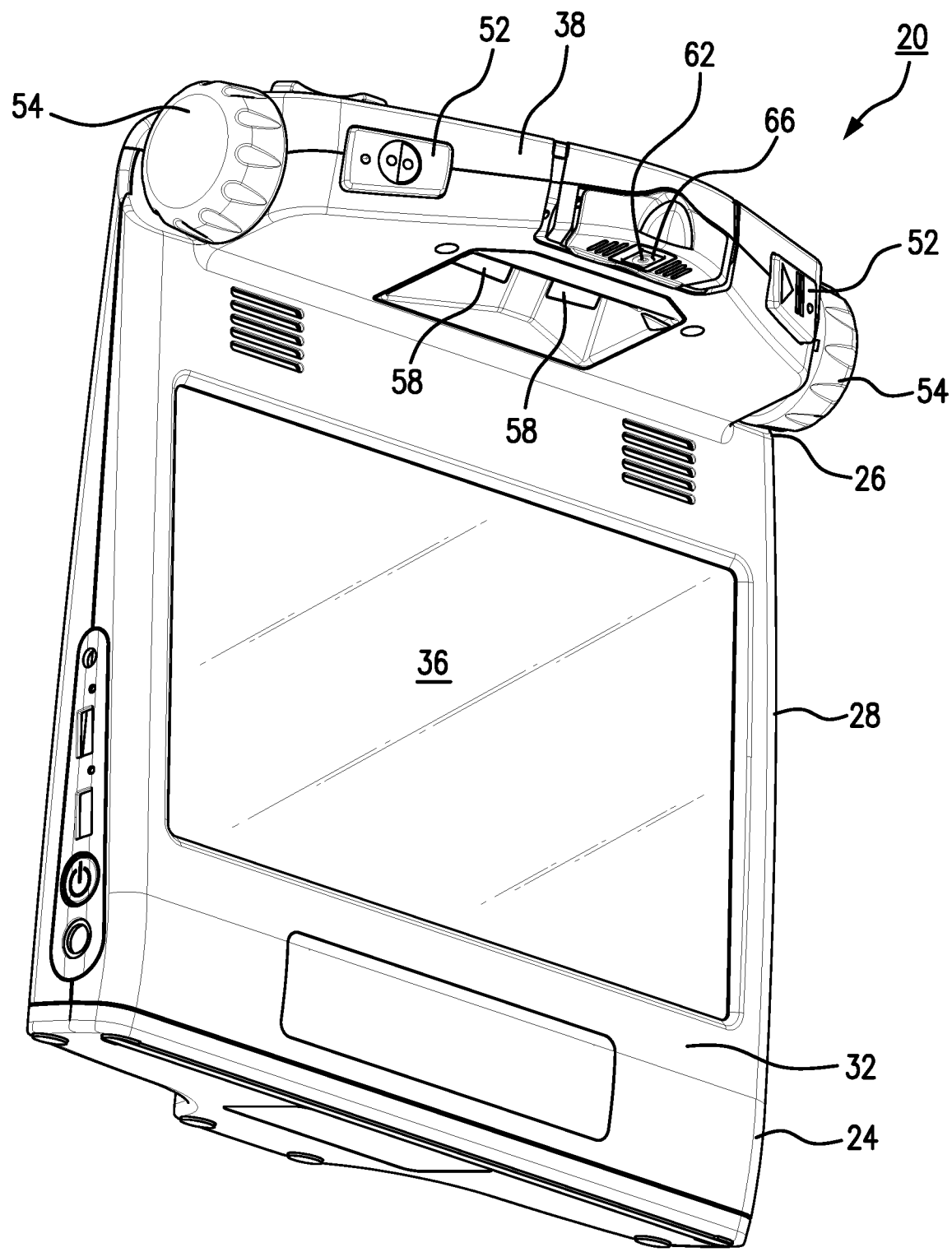
FIG. 4 is a perspective view of the vision assistive device of the present disclosure.
Figure 5:
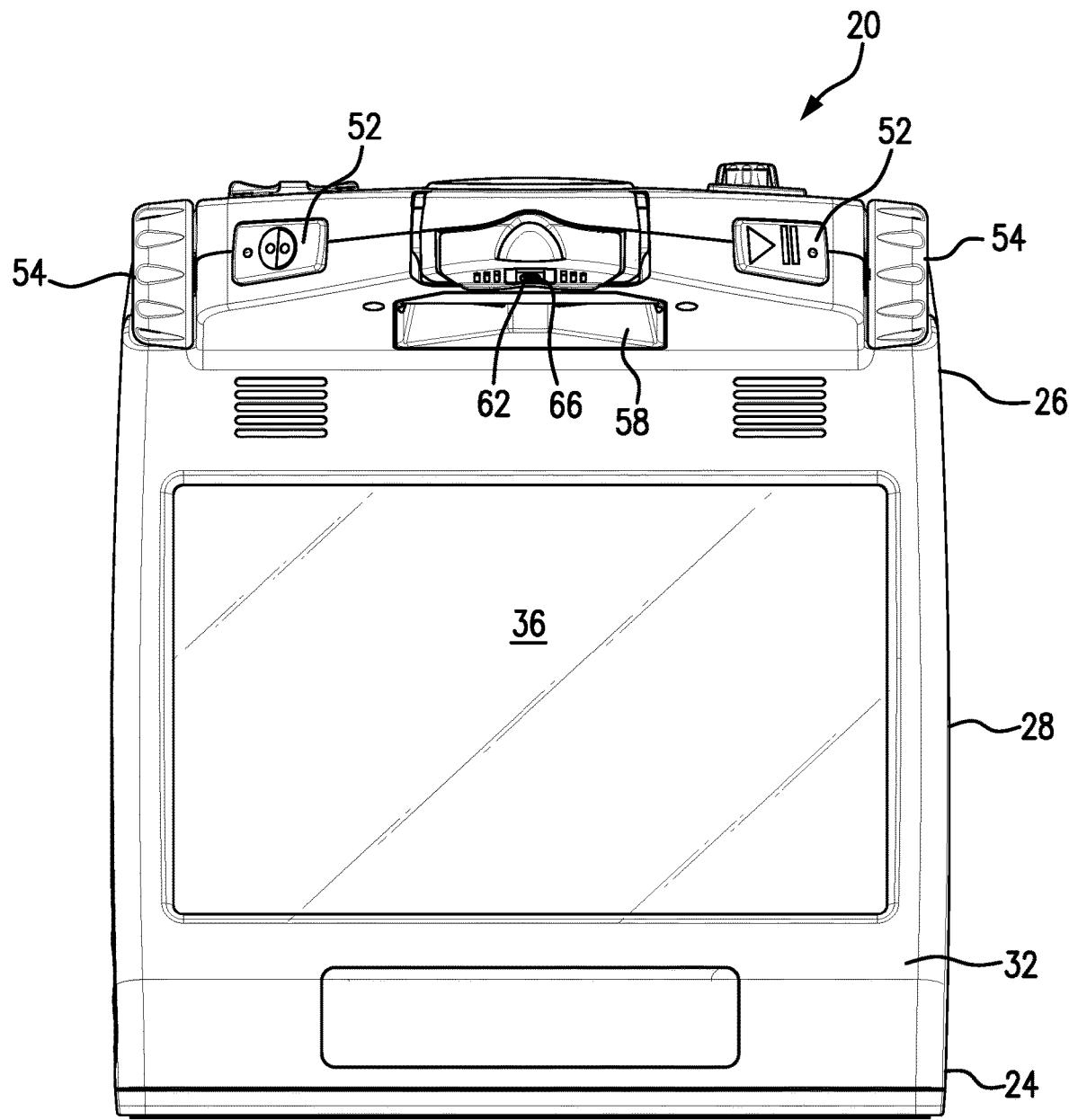
FIG. 5 is a front elevational view of the vision assistive device of the present disclosure.

In the example depicted in FIG. 3, the object is a standard 8½×11 piece of paper with associated writing. The device's extended depth of field allows the paper to be placed in portrait mode with respect to housing 22. Namely, in portrait mode, the short side of the paper would be oriented adjacent to the base region of the housing 22 and would extend lengthwise away from housing 22 with axis 77 (running the length of the paper) oriented at a 90° angle to device 20. If only a single image is taken, some regions would be in focus and other regions would be out of focus. For example, if the paper is divided into three equal sections, a single image with a single area of focus, would result in an image with one of the three regions being in focus and the other two regions being out of focus.

However, in accordance with the disclosure, this undesirable result is avoided by selectively changing the focal length "F" and the area of focus. For example as noted in FIG. 3, image sensor 62 may start with an area of focus at the top portion of the paper 76(*a*) and then move to the intermediate portion of the paper 76(*b*) and finally at the bottom portion 76(c) of the paper. Again, such a sequential movement of image sensor 62 could be carried out by adjusting the spacing between sensor 62 and lens 66 in conjunction with digitally processing the resulting image to alter its area of focus. Alternatively, a focus motor 72 can be used to physically rotate image sensor 62 to thereby eliminate the need for any digital processing. The programming for focus motor 72 may be stored in on-board memory. For example, programming may be stored for specific sizes of paper or for specific objects. Alternatively, the user could manually operate the focus motor 72 to image three or more regions as needed.

In the embodiment depicted in FIG. 3, as a result of changing the area of focus, three discreet static images, each with a different area of focus, are generated. These images are stored in onboard memory 80 and combined into one composite image 78 via a "Z-stitching" technique. Z-stitching is a digital process whereby multiple images are integrated along a Z-axis with digital processing being used to match the boundaries between the images, eliminate blurry areas, and avoid any unnecessary overlap. As noted in FIG. 3, these images (76(a), 76(b), and 76(c)) would be combined into one image 78 with no areas that are out of focus. In other words, the resulting composite image 78 is completely in focus. Thus, by utilizing the focus motor 72 or via digital processing an extended depth of field is achieved with the use of only a single camera. Notably, the depth of field can be extended both laterally or medially.

Figure 2:
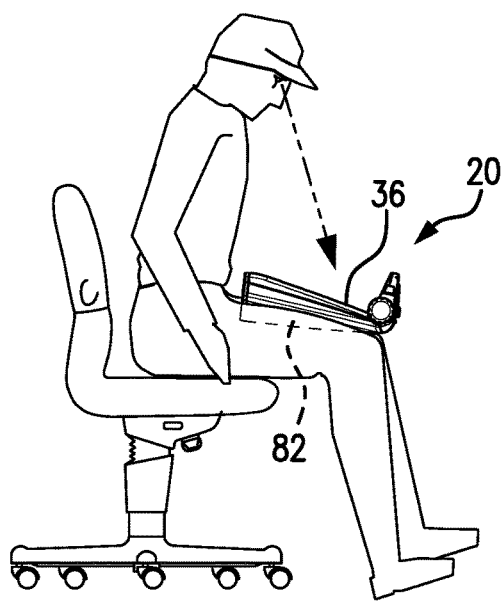
FIG. 2 is a side view of the vision assistive device in the reclined orientation upon a user's lap.
Figure 6:
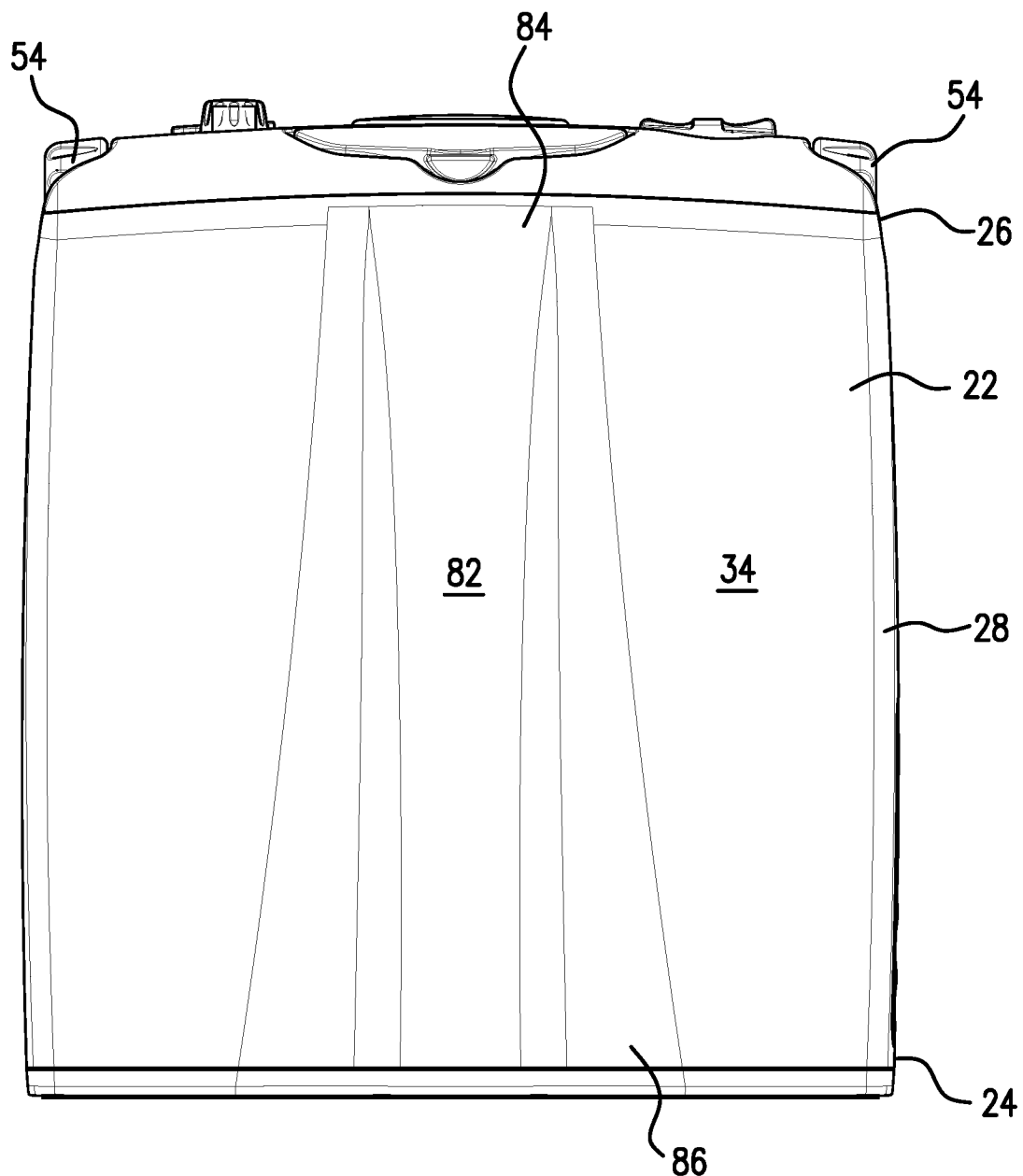
FIG. 6 is a rear elevational view of the vision assistive device of the present disclosure.
Figure 7:
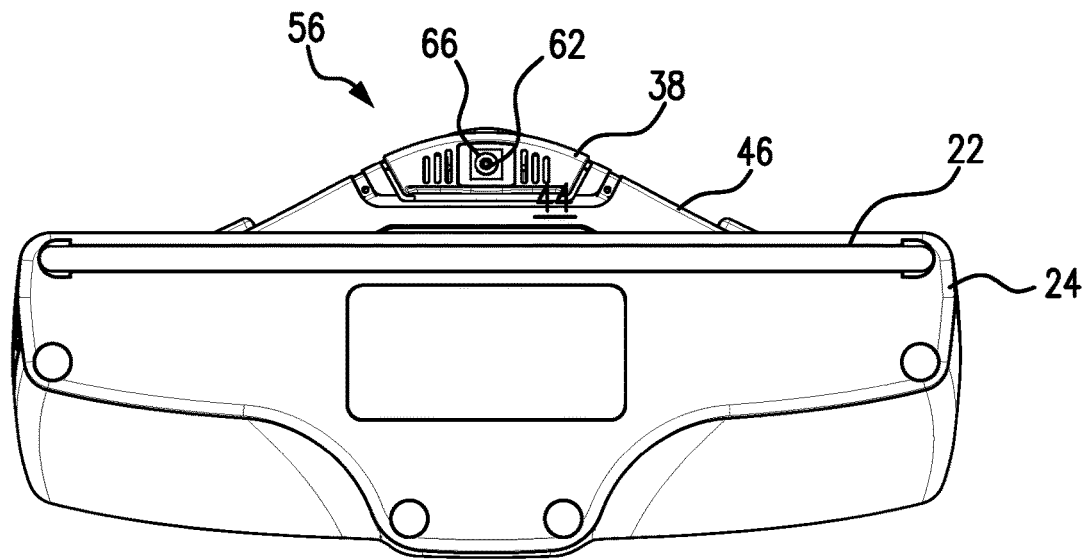
FIG. 7 is a bottom plan view of the vision assistive device of the present disclosure.

Next as illustrated in FIGS. 6 and 7, the fin 82 of the device is described. Fin 82 extends from the back wall 34 of housing 22 and includes both upper and lower extents (84 and 86). Upper extent 84 of fin 82 is at the top region 26 of housing 22 with the lower extent 86 of fin 82 being at the base region 24 of housing 22. In accordance with the disclosure, fin 82 flares outwardly from its upper to its lower extent. Accordingly, the upper extent 84 of fin 82 is relatively thin compared to the lower extent 86 of fin 82, which is substantially thicker. Thus, when device 20 is oriented in its generally vertical orientation on a desktop, fin 82 assists in stabilizing device 20. Conversely when device 20 is being used upon a user's lap, fin 82 can be positioned between the user's leg as illustrated in FIG. 2. Thus, fin 82 permits device 20 to be used in multiple orientations.

The present disclosure includes that contained in the appended claims, as well as that of the foregoing description. Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and scope of the invention.

What is claimed is:

1. A vision assistive device with an extended depth of field, the vision assistive device comprising:
 a housing having a base region, a top region, and an intermediate extent therebetween, the housing further including a front wall and a back wall, a screen positioned within the front wall;
 an overhang formed at the top region of the housing, the overhang including a top surface, a bottom surface, opposing sides, and a forwardly facing peripheral extent, controls for the vision assistive device positioned within the top surface and the forwardly facing peripheral extent;
 a single imaging unit positioned within the bottom surface of the overhang, the single imaging unit adapted to image an object positioned below the overhang, the distance between the single imaging unit and object constituting a focal length; and
 a focus motor operatively connected to the single imaging unit, the focus motor functioning to selectively vary the focal length and take sequential images of the object at different focal lengths;
 a fin extending from the back wall of the housing, wherein the fin has an upper extent at the top region of the housing and a lower extent at the bottom region of the housing, with the fin functions to stabilize the device when the device is being used upon a desktop and further facilitating use of the device upon the lap of the user.

2. The vision assistive device as described in claim 1 wherein the imaging unit comprises an image sensor and a lens, and wherein the focal length is adjusted by changing the distance between the lens and image sensor.

3. The vision assistive device as described in claim 1 wherein the sequential images are stored in an on-board memory and thereafter combined into a single composite image.

4. The vision assistive device as described in claim 1 wherein the imaging unit includes a static image sensor, the focal length of the static image sensor being adjusted via digital processing.

5. An imaging device with an improved depth of field, the device comprising:
 a housing with a base portion, an upper region, and a front face, an overhang formed at the upper region, a screen positioned within the front face;
 an imaging unit positioned within the overhang, the imaging unit including an image sensor and a lens, the image sensor having an area of focus that can be digitally adjusted;
 a memory store for storing and subsequently combing a plurality of images taken by the image sensor, with each of the plurality of images having a different area of focus;
 whereby an extended depth of field can be achieved by combining the plurality of images into a single composite image;
 a fin with an upper and lower extent, the fin extending from a back wall of the housing and flaring outwardly from the upper to the lower extent, the fin supporting the device when oriented in a vertical orientation and when positioned between a user's legs.

6. A vision assistive device with an extended depth of field, the device adapted to be used on a desktop or upon the lap of a user, the vision assistive device comprising:
 a housing having a base region and, a top region, the housing further including front and back faces, a screen positioned within the front face;
 an overhang formed at the top region of the housing, the overhang including a bottom surface, controls for the vision assistive device associated with the overhang, first and second rollers positioned at the opposing sides;
 an imaging unit positioned within the bottom surface of the overhang, the imaging unit adapted to image an object positioned below the overhang, the imaging unit including an image sensor and a lens, the distance between the image sensor and the object constituting a focal length, a focus motor operatively connected to the image sensor and functioning to pivot the image sensor about two intersecting perpendicular axes, the pivoting of the image sensor changing the focal length, and whereby the imaging unit can take multiple images with differing focal lengths;

a fin extending from the back wall of the housing, the fin having an upper extent at the top region of the housing and a lower extent at the bottom region of the housing, the lower extent of the fin being substantially thicker than the upper extent, the fin functioning to stabilize the device when the device is being used upon a desktop and further facilitating use of the device upon the lap of the user.

* * * * *